US011119383B2

(12) United States Patent
Byrnes et al.

(10) Patent No.: US 11,119,383 B2
(45) Date of Patent: Sep. 14, 2021

(54) TELESCOPE ARRAYS AND SUPERIMPOSED VOLUME GRATINGS FOR LIGHT FIELD GENERATION

(71) Applicant: The Charles Stark Draper Laboratory, Inc., Cambridge, MA (US)

(72) Inventors: Steven J. Byrnes, Watertown, MA (US); Gregg E. Favalora, Bedford, MA (US); Ian Ward Frank, Arlington, MA (US); Joseph J. Register, St. Petersburg, FL (US); Michael G. Moebius, Somerville, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 214 days.

(21) Appl. No.: 16/041,040

(22) Filed: Jul. 20, 2018

(65) Prior Publication Data

US 2019/0025667 A1    Jan. 24, 2019

Related U.S. Application Data

(60) Provisional application No. 62/535,616, filed on Jul. 21, 2017.

(51) Int. Cl.
*G02F 1/335*     (2006.01)
*G02F 1/33*      (2006.01)
*G02B 30/50*     (2020.01)

(52) U.S. Cl.
CPC ............ *G02F 1/335* (2013.01); *G02B 30/50* (2020.01); *G02F 1/332* (2013.01);
(Continued)

(58) Field of Classification Search
CPC ............ G02B 2006/0098; G02B 6/105; G02B 2006/12104; G02B 2006/12107; G02B 30/26; G02B 6/005; G02B 6/0078; G02B 2006/12085; G02B 6/0045; G02B 6/12004; G02B 5/32; G02B 6/12007; G02B 6/34; G02B 2006/12142; G02B 30/00; G02B 2006/12102; G02B 2027/0123;
(Continued)

(56) References Cited

U.S. PATENT DOCUMENTS 5,083,856 A * 1/1992 Hatori ................. G02F 1/335
                                                   359/285
2014/0300694 A1  10/2014 Smalley et al.
(Continued)

OTHER PUBLICATIONS

International Preliminary Report on Patentability dated Jan. 30, 2020, from International Application No. PCT/US2015/043055, filed on Jul. 20, 2018. Nine pages.
(Continued)

*Primary Examiner* — Brandi N Thomas
(74) *Attorney, Agent, or Firm* — HoustonHogle LLP

(57) ABSTRACT

Acousto-optical modulators, such as a SAW modulators, with telescope arrays and superimposed volume gratings for light field generation are disclosed. These devices can employ pixelated demagnification and have layers of output optics, such as reflective gratings and/or arrays of transmissive refractive or diffractive lenses that manipulate the light emitted by the SAW modulator. In other cases, superimposed volume gratings are used, in which pixilation occurs in angle space.

16 Claims, 16 Drawing Sheets

(52) U.S. Cl.
CPC .... *G02F 2201/06* (2013.01); *G02F 2201/305* (2013.01); *G02F 2201/34* (2013.01)

(58) Field of Classification Search
CPC ........ G02B 2027/014; G02B 2027/015; G02F 1/335; G02F 2203/24; G02F 1/125; G02F 2201/34; G02F 2203/07; G02F 1/0353; G02F 2201/302; G02F 2203/28; G02F 2203/58; G02F 2201/305; G02F 2201/05; G02F 2201/18; G02F 2203/023; G02F 1/11; G02F 2201/307; G02F 2202/20; G02F 2203/22; G02F 1/0311; G02F 1/332; G02F 2001/311; G02F 2201/30; G02F 1/133504
USPC ......... 359/237, 265–267, 273–273, 310–315
See application file for complete search history.

(56) References Cited

U.S. PATENT DOCUMENTS

| | | |
|---|---|---|
| 2014/0300695 A1 | 10/2014 | Smalley et al. |
| 2016/0223988 A1 | 8/2016 | Bove, Jr. et al. |
| 2018/0074457 A1 | 3/2018 | Jolly et al. |
| 2018/0217414 A1 | 8/2018 | Byrnes et al. |
| 2018/0217473 A1 | 8/2018 | Frank et al. |
| 2018/0284466 A1 | 10/2018 | Moebius et al. |
| 2018/0284562 A1 | 10/2018 | Register et al. |
| 2018/0284563 A1 | 10/2018 | Register et al. |
| 2018/0329271 A1 | 11/2018 | Frank et al. |

OTHER PUBLICATIONS

Hirsch, M., et al., "A Compressive Light Field Projection System," Vancover Siggraph 2014 Naturally Digital, 1-38 (2014).
Hirsch, M., et al., "A Compressive Light Field Projection System," MIT Media Lab, 1-12 (2014).
Jolly, S., et al., "Near-to-Eye Electroholography via Guided-Wave Acousto-Optics for Augmented Reality," Proc. of SPIE, 10127: 101270J-1-101270J-11 (2017).
Kakio, S., "Acousto-Optic Modulator Driven by Surface Acoustic Waves," Acta Physica. Polonica, 127(1): 15-19 (2015).
International Search Report and Written Opinion, dated Nov. 15, 2018, from International Application No. PCT/US2018/043055, filed on Jul. 20, 2018. Fifteen pages.
Byrnes, S.J., et al., "Designing large, high-efficiency, high-numerical-aperture, transmissive meta-lenses for visible light", Optics Express 24 (5), 5110-5124 (2016).
Geng, J., "Three-Dimensional Display Technologies," Advances in Optics and Photonics, 5: 456-535 (2013).
Gneiting, S., et al., "Optimizations for Robust, High-Efficiency, Waveguide-Based Holographic Video," Industrial Informatics (INDIN), 2016 IEEE 14th International Conference, 576-581 (2016).
Hinkov, V.P., et al., "Collinear Acoustooptical TM-TE Mode Conversion in Proton Exchanged Ti:LiNbO3 Waveguide Structures," J. Lightwave Tech., 6(6): 903-908 (1988).
Matteo, A.M., et al., "Collinear Guided Wave to Leaky Wave Acoustooptic Interactions in Proton-Exchanged LiNbO3 Waveguides," IEEE Trans. on Ultrasonics, Ferroelectrics, and Frequency Control, 47(1): 16-28 (2000).
McLaughlin, S., et al., "Optimized guided-to-leaky-mode device for graphics processing unit controlled frequency division of color," Appl. Opt., 54(12): 3732-3736 (2015).
Onural, L., et al., "New high-resolution display device for holographic three-dimensional video: principles and simulations," Optical Engineering, 33(3): 835-844 (1994).
Pan, Y. et al., "A Review of Dynamic Holographic Three-Dimensional Display: Algorithms, Devices, and Systems," IEEE Transactions on Industrial Informatics, 12(4): 1599-1610 (2016).
Qaderi, K., et al., "Paired leaky mode spatial light modulators with a 28° total deflection angle", Optics Letters, 42, 1345: 1-5 (2017).
Qaderi, K., et al., "Leaky-mode waveguide modulators with high deflection angle for use in holographic video displays," Opt. Expr., 24(18): 20831-20841 (2016).
Savidis, N., et al., "Progress in fabrication of waveguide spatial light modulators via femtosecond laser micromachining," Proc. of SPIE vol. 10115 (2017).
Smalley, D.E., et al., "Anisotropic leaky-mode modulator for holographic video displays," Nature, 498: 313-317 (2013).
Smithwick, Q.Y., et al., "Real-time shader rendering of holographic stereograms," Proc. SPIE, 7233, 723302-1-723302-12 (2009).

* cited by examiner

TELESCOPE ARRAYS AND SUPERIMPOSED VOLUME GRATINGS FOR LIGHT FIELD GENERATION

RELATED APPLICATIONS

This application claims the benefit under 35 USC 119(e) of U.S. Provisional Application No. 62/535,616, filed on Jul. 21, 2017, which is incorporated herein by reference in its entirety.

BACKGROUND OF THE INVENTION

A number of proposed autostereoscopic (naked-eye) 3D displays or, more broadly, light field generator architectures utilize a variety of scanning, diffraction, space-multiplexing, steered illumination, and other techniques. One category, electro-holographic displays, relies principally on diffractive phenomena to shape and steer light. Examples of electro-holographic displays are described in: Jason Geng, *Three-dimensional display technologies*, Advances in Optics and Photonics, 5, 456-535 (2013). (see pp. 508-516) and Yijie Pan et al., *A Review of Dynamic Holographic Three-Dimensional Display: Algorithms, Devices, and Systems*, IEEE Transactions on Industrial Informatics, 12(4), 1599-1610 (August 2016). Electro-holographic light field generators hold the promise of projecting imagery with the ultimate in realism: curved optical wavefronts, which can genuinely replicate the real world. Such displays can theoretically provide nearly perfect characteristics of visual depth information, color rendering, optical resolution, and smooth transitions as viewers change their location. So far, displays built on this technology have not achieved this theoretical level of performance, however.

One specific device category that provides controllable sub-holograms from which a light field can be constructed uses what is known as a leaky mode surface acoustic wave (SAW) modulator. These devices are a subclass of acousto-optic modulators (AOMs) and generally use acoustic waves to diffract light. A SAW is generated in a piezoelectric substrate under radio frequency (RF) excitation. This creates a time-varying diffracting region that interacts with input light in a waveguide in the substrate. This causes at least some of the light to change from a guided mode within the waveguide to a leaky mode that exits the waveguide. These devices are described more fully, for example, in:

Onural et al., "New high-resolution display device for holographic three-dimensional video: principles and simulations," Optical Engineering, vol. 33(3), pp. 835-44 (1994);

Matteo et al., *Collinear Guided Wave to Leaky Wave Acoustooptic Interactions in Proton-Exchanged LiNbO3 Waveguides*, IEEE Trans. on Ultrasonics, Ferroelectrics, and Frequency Control, 47(1), 16-28 (January 2000);

Smalley et al., Anisotropic leaky-mode modulator for holographic video displays, Nature, 498, 313-317 (20 Jun. 2013);

U.S. Pat. App. Publ. US 2014/0300695; Full Parallax Acousto-Optic/Electro-Optic Holographic Video Display;

Gneiting et al., *Optimizations for Robust, High-Efficiency, Waveguide-Based Holographic Video*, Industrial Informatics (INDIN), 2016 IEEE 14th International Conference on, (19-21 Jul. 2016);

Hinkov et al., Collinear Acoustooptical TM-TE Mode Conversion in Proton Exchanged Ti:LiNbO$_3$ Waveguide Structures, J. Lightwave Tech., vol. 6(6), pp. 900-08 (1988);

McLaughlin et al., Optimized guided-to-leaky-mode device for graphics processing unit controlled frequency division of color, Appl. Opt., vol. 54(12), pp. 3732-36 (2015);

Qaderi et al., Leaky-mode waveguide modulators with high deflection angle for use in holographic video displays, Opt. Expr., vol. 24(18), pp. 20831-41 (2016); and Savidis et al., Progress in fabrication of waveguide spatial light modulators via femtosecond laser micromachining, Proc. of SPIE Vol. 10115, (2017).

FIG. 1 shows an exemplary prior art SAW optical modulator 100. It can be used to deflect light of the same or different colors/wavelengths 101a, 101b, 101c from guided modes by different angles simultaneously, or serially, in time.

The modulator 100 comprises a substrate 120 in which or on which an optical waveguide 102 has been formed. The input light 101 at one or more wavelengths enters waveguide 102. An in-coupling device 106 is used to couple the input light 101 carried in an optical fiber, for example, into the waveguide 102. Examples of in-coupling devices 106 include in-coupling prisms, gratings, or simply butt-coupling. These are used to couple light in an optical fiber or light in free-space into the waveguide 102. The input light 101 is launched into a guided mode upon entry into the waveguide 102. Commonly, the TE (transverse electric) mode is guided.

In such a SAW modulator 100, the waveguide 102, e.g., slab waveguide, is typically created in a lithium niobate substrate 120 by proton-exchange. SAW transducers (e.g., interdigital transducers (IDTs) 110 are fabricated on the substrate 120. The transducers 110 induce sSAWs 140 in the substrate 120 that propagate along the waveguide 102. Such transducers 110 are often driven electrically, e.g. using a 300-500 MHz radio frequency (RF) drive signal 15.

The guided mode or modes interact with the surface acoustic wave 140. The result of this interaction between the SAW 140 and the light in the waveguide 102 is that a portion of the guided light is polarization-rotated, out of the guided mode and into a leaky mode having the transverse magnetic (TM) polarization. The light then exits the waveguide 102 as leaky-mode or diffracted light 162 into the bulk substrate 120 at angle φ, measured from grazing 77. At some point this diffracted light 162 exits the substrate 120 at an exit face. In the illustrated example, the light exits through the substrate's end face 170 (as shown) as exit light 150 at an exit angle of θ. This configuration is referred to as edge-fire. The range of possible exit angles θ comprises the angular extent, or exit angle fan, of the exit light 150.

Other SAW modulator configurations have different exit faces. For example, it is also common to operate the modulator so that the exit face is the distal face 168. Moreover, some reflective configurations result in the light exiting out the proximal face 160.

Practical electronic constraints and materials properties often limit the resulting angular extent, or exit angle fan of SAW devices. (2016) reports that a total output angle of approximately 20° can be achieved, which is significantly lower than the field of view of contemporary 2D displays that approach 180°. Others have attempted to increase the exit angle fan of the diffracted output light 150 in various ways such as by optimizing various modulator parameters to increase the useful bandwidth of the RF driver such as waveguide depth and IDT design (in published systems, the output angle is a function of MT drive frequency), by using edge-emitting modulators having "right-angle" edges, by doubling the angle fan via waveguides on both sides of the wafer, and/or by demagnification (i.e. using a large lens to demagnify an area of numerous modulators to provide a smaller visible display area having larger field of view). But it does not appear that any of these are adequate to achieve an angle fan as high as 90°, which would be desirable for some cases, in any sort of flat form-factor.

SUMMARY OF THE INVENTION

A number of other solutions have been proposed to address the limited viewing angle and directionality of the exit light. One well-known approach to increasing the angular extent is to demagnify and thereby amplify the angular range of the output. However, not only does the area of the image decrease, but this solution is incompatible with providing thin displays. these demagnifying displays typically require lenses of comparable size and separation to the size of the display.

The present invention concerns improvements over currently proposed holographic display systems using acousto optic modulators (AOMs) such as surface acoustic wave (SAW) modulators. One embodiment concerns a SAW modulator having a pixelated demagnification capability. This not only can provide significant increases to the exit angle of the exit light emitted from the SAW modulator as compared to existing SAW modulators, but also enables the exit angle to be relatively independent of where the light is diffracted out of the waveguide. Moreover, the techniques are compatible with emitting light from the top or bottom of the modulator, which is advantageous for building a thin, large-area display in addition to the edges.

The present invention also concerns SAW modulators with one or more volume gratings, where the volume gratings can achieve similar increases in exit angle and relative invariance of the exit angle as in the pixelated demagnification modality.

In general, according to one aspect, the invention features an acousto-optical modulator, such as a leaky mode SAW modulator. The modulator comprises a substrate and two arrays of transmissive optics for serially conditioning light diffracted in the substrate. The arrays are serial in the sense that light leaving one array enters the other array. In this way the arrays form a telescopic system.

In one example, the first array of transmissive optics focuses the light, but in other rare examples, the first array of transmissive optics might cause the light to diverge.

Also, one of the arrays could include reflective optics.

Preferably, the second array of transmissive optics collimates the light.

Typically, a spacer layer is used and the two arrays of transmissive optics are on either side of the spacer layer.

The spacer layer can be located in a number of positions with respect to the substrate. The spacer layer can be attached to a distal face, and end face, or a proximal face. In additional, the face may or may not be angled.

Further, the arrays can take a number of forms such as refractive microlenses and/or transmissive diffractive microlenses.

In general, according to another aspect, the invention features a method for fabricating an acousto-optical modulator. The method comprises fabricating a modulator in a substrate, attaching a spacer layer to the substrate, and providing an array of transmissive optics between the substrate and the spacer layer for conditioning light diffracted in the substrate.

Preferably, a second array of transmissive optics is provided, with one array on either side of the spacer layer.

The spacer layer can be bonded to the substrate and then the substrate can be thinned.

In general, according to another aspect, the invention features acousto-optical modulator, comprising a substrate and a volume grating for conditioning light diffracted in the substrate.

In general, according to another aspect, the invention features a SAW modulator system. The system includes SAW modulators. Each of the SAW modulators has two arrays of transmissive optics for conditioning light diffracted in substrates of the SAW modulators. The arrays of transmissive optics direct light across gaps between the SAW modulators to thereby obscure the existence of the gaps to a viewer, for example.

In general according to another aspect, the invention features a method for fabricating an acousto-optical modulator. The method comprises fabricating a modulator in a substrate, attaching a spacer layer to the substrate, and thinning the substrate.

In general according to another aspect, the invention features a method for generating a light field. The method comprises diffracting light from a waveguide with a SAW and serially conditioning light diffracted in the substrate with two arrays of transmissive optics.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2B shows a typical width and alignment tolerance of at least two output optical layers added to the SAW modulator, where the at least two optical layers function as a diffractive telescope array that provides the pixelated demagnification capability;

FIG. 2F shows an expanded side view of the SAW modulator in FIG. 2E;

FIGS. 7A-1 and 7A-2 show plots of numerical simulations of intensity of light as a function of exit angle for existing SAW modulators having a single exit optic (e.g. single lens), where FIG. 7A-1 shows the intensity of the light signals at an ideal instant and FIG. 7A-2 shows the light intensity for a 20 nanosecond (ns) pulse;

FIGS. 7B-1 and 7B-2 show plots of numerical simulations of light intensity as a function of exit angle for the proposed SAW modulators providing a two-optic telescopic pixelated demagnification capability, where FIG. 7B-1 shows the intensity of the light signals at an ideal instant and FIG. 7B-2 shows the light intensity for a 20 nanosecond (ns) pulse;

FIGS. 8A-1 and 8A-2 show plots of numerical simulations of light intensity as a function of exit angle for existing SAW modulators as in FIGS. 7A-1/7A-2, where FIG. 8A-1 shows the light intensity when no uncompensated acoustic dispersion is present and FIG. 8A-2 shows the light intensity as affected by an uncompensated acoustic dispersion of 0.03 (m/s)/MHz;

FIGS. 8B-1 and 8B-2 show plots of numerical simulations of light intensity as a function of exit angle for the proposed SAW modulators providing a two-optic telescopic pixelated demagnification capability, where FIG. 8B-1 shows the light intensity when no uncompensated acoustic dispersion is present and FIG. 8B-2 shows the light intensity as affected by an uncompensated acoustic dispersion of 0.03 (m/s)/MHz;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figures 2, 7A:
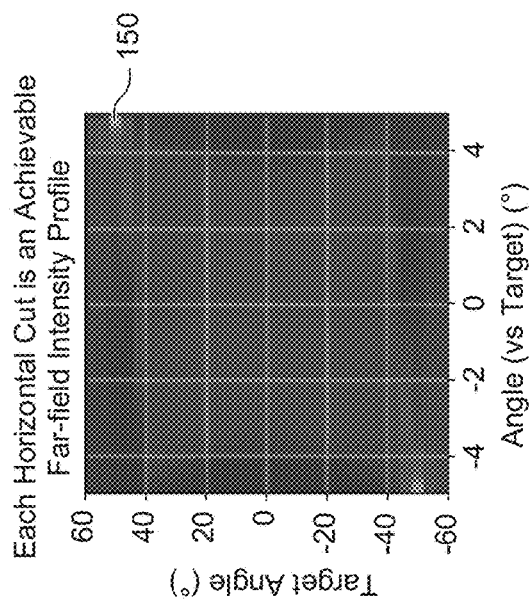

FIG. 2 shows a side cross-section showing the details of a SAW modulator 100 constructed in accordance with the principles of the present invention.

The optical substrate 120, in practice, especially for commercial devices, will contain tens to hundreds, or more, of these modulators 100, side-by-side, into the plane of the figure. Each SAW modulator 100 includes a waveguide 102 having opposing waveguide ends 102-N and 102-F. At the near waveguide end 102-N, there is the light in-coupling device 106. Also at the near end 102-N are one or more surface acoustic wave (SAW) transducers 110 such as IDTs.

As mentioned before, the optical substrate 120 may be made, for example, of a suitable piezoelectric material such as lithium niobate (LiNbO3), quartz (SiO$_2$), or lithium tantalate (LiTaO3) following known processes. These materials exhibit a birefringence property that allows for the convenient conversion of light into leaky modes and convenient polarization-based filtering of scattered light. Many other materials and design choices are available including other piezoelectric materials and crystallographic orientations, and waveguide architectures such as planar, ridge, rib, embedded, immersed, and bulged. Doping such as MgO-doped lithium niobate may be useful, in some cases. The optical substrate 120 may range in x-dimension (across the page) or y-dimension (into the page) of 1 centimeters (cm) (for near-eye display applications) to over 20 cm (for larger displays at larger viewing distances). Typically, the thickness (z-dimension) of the optical substrate 201 ranges from t1 0.2 millimeters (mm) to 3 mm.

The in-coupling device 106 (e.g., butt-coupled fiber (shown), optical grating or prism) couples input light 101 carried in an optical fiber 104, for example, from an illumination source into the waveguide 102 for TE-like (transverse electric) guided mode confinement of the input light within the waveguide 102. In a display application, the input light 101 is likely to be linearly polarized, and may be pulsed or continuous.

In different embodiments, the SAW transducer 110 can occupy a variety of specific locations and specific orientations with respect to their respective waveguide 102. In the illustrated embodiment, the SAW transducers 110 are located at the near end 102-N of the waveguides 102, near the in-coupling devices 106. Thus, the SAWs propagate, in a direction as the light in the waveguides 102. In other examples, however, the SAW transducers 110 can be located near the far-end 102-F of the waveguide 102, and counter propagate to the light. Moreover, there could be multiple SAW transducers 110 for each waveguide 102, with each SAW transducer 110 responsible for a different specific bandwidth around a given center frequency (e.g., 100-200 MHz, 200-300 MHz, and 300-400 MHz).

In operation, the generation of the SAW is timed with the light in the waveguide 102 to interact and convert a portion of that light to the transverse magnetic (TM) polarization. Birefringence of the waveguide 102 and the optical substrate 120 (and/or the wave-vector change from the interaction) causes the diffraction and deflection of light out of the waveguide 102 as diffracted light 162.

The illustrated embodiment provides for pixelated demagnification of diffracted light. Output optics 210 and 220 sandwich a spacer layer 230. The output optics 210 and 220 are arranged to form a telescope-like lens system. This system of optics manipulates the diffracted light 162 emitted out from the SAW modulator's substrate 120, sending the diffracted light 162 ultimately out of the spacer layer 230 as exit light 150 for viewing by one or more observers.

In more detail, the spacer layer 230 may be made from any convenient transparent material, such as glass. The first output optics 210 and the second output optics 220 are shown fabricated in respective layers 212 and 222 on either side of the spacer layer 230. Specifically a first output optics layer 212 is located at a first optics layer distance t1 measured down from the proximal face 160 of the SAW substrate 120, and will typically correspond to the thickness of the SAW substrate 120. The distance t1 is typically less than 1 mm. The second output optics layer 220 is located at a second optics layer distance t2 measured down from the first optics layer 212 and is typically 5 mm, and corresponds to the thickness of the spacer layer 230.

The first output optics 210 and the second output optics 220 are typically arrays of optical elements. The total length L1 of the first output optics 210 and the second output optics 220 in the direction of the waveguide 102 is perhaps 500 micrometers (μm) long in one specific example, and typically ranges between 100 μm to 10 mm. Each micro-optic element 210-1, 210-2 . . . 210-n of the first output optic 210 is aligned with a corresponding matching micro-optic 220-1, 220-2 . . . 220-n in the bottom micro-optics array 70B.

In the illustrated embodiment each of the first output optics 210 and the second output optics 220 are shown as having only three (3) micro-optic elements: 210-1, 210-2, 210-3, 220-1, 220-2, 220-3, but in practice the total number of elements (n) could be more, such as 5, or 10 or 50 or more.

Additionally, the first output optics 210 and the second output optics 220 can each be an array of diffractive microlenses, an array of reflective microlenses (curved mirrors), or an array of refractive microlenses, in different examples.

Different combinations of divergent and convergent optics can be used. For example, in the illustrated embodiment, the second output optics 220 is shown as convergent. However, in the configuration of a Keplerian telescope, the second output optics 220 could instead be divergent, in which case the shared focal plane 240 is located at a point below the second output optics 220, i.e. in the configuration of a Galilean telescope.

In either case, the first output optics 210 and the second output optics 220 together effectively demagnify the emissive area. This has the effect of correspondingly increasing the range of exit angles of the exit light 150 emitted from the second output optics 220. In one example, if the shared focal plane 240 is 20 times closer to the second output optics 220 than the first output optics 210, then the effective emissive area within each pixel of the display decreases by roughly a factor of 20, while the range of exit angles increases by a comparable factor, when compared to a simple non-magnifying face-emitting configuration such as via a constant-pitch outcoupling grating.

In effect, the display occupies the same area but is chopped up into little emissive specks, one speck per pixel per color. This illustrates the difference between normal demagnification and pixelated demagnification. Generally, pixelated demagnification is preferred because it allows for a thin form factor, and a larger display.

Pixelated demagnification is generally compatible with shifting of the horizontal focal plane using chirped RF pulses. See Smithwick et al., "Real-time shader rendering of holographic stereograms", Proc. SPIE 7233, 723302 (2009). However, the precise extent to which the focal plane can be manipulated depends on details like demagnified pixel size and RF bandwidth.

The first output optics array 210 and the second output optics array 220 can be optimized to reduce reflections, scattering, and/or spurious diffraction orders, using well-known algorithms and designs. For example, see Byrnes et al., "Designing large, high-efficiency, high-numerical-aperture, transmissive meta-lenses for visible light", Optics Express 24, 5110 (2016).

Figure 2A:
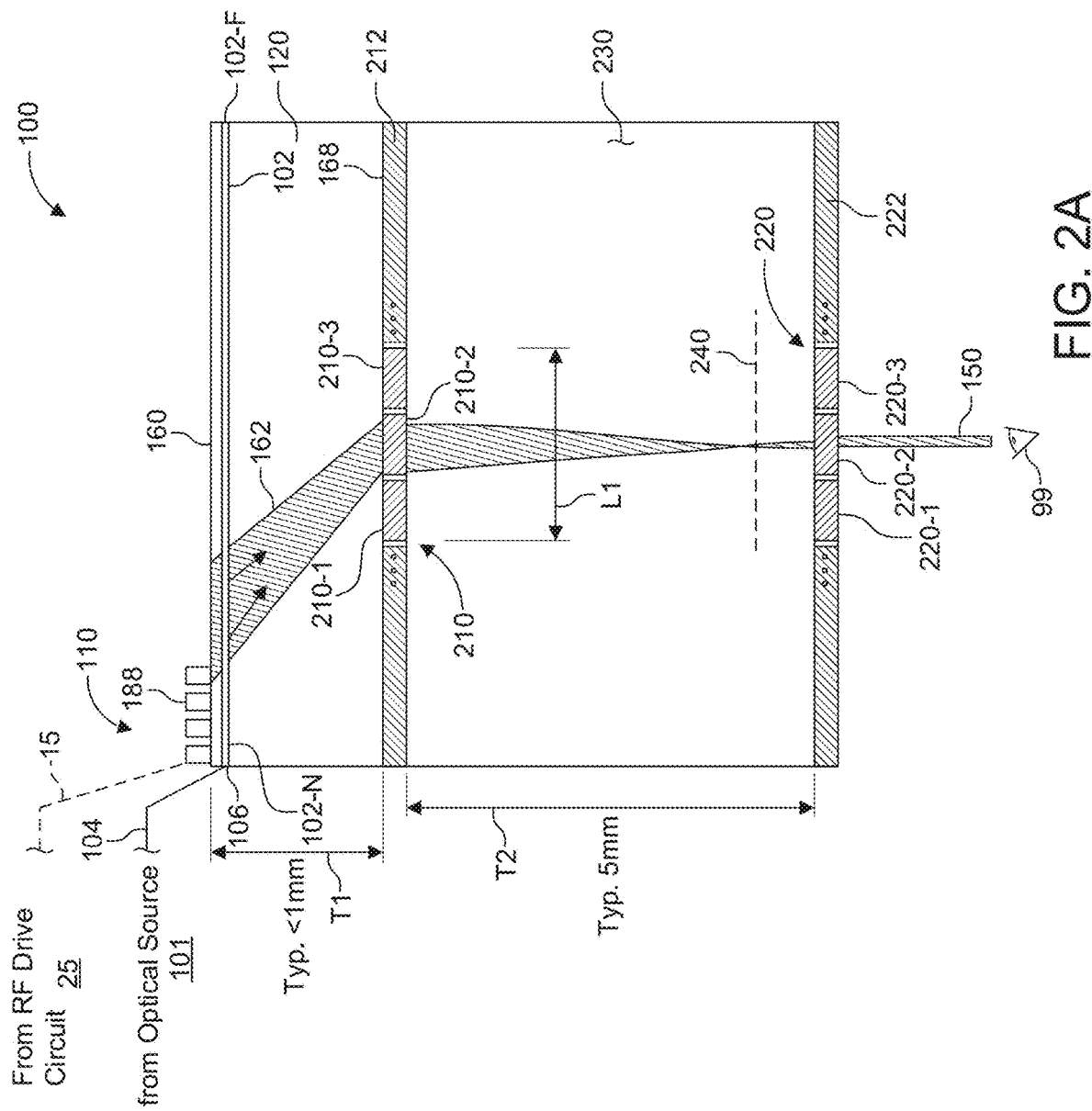
FIG. 2A is a cross-sectional side view of SAW modulator constructed in accordance with principles of the present invention, where the SAW modulator provides a pixelated demagnification capability for focusing light within and emitted from the SAW modulator, and where the modulated light are emitted from a distal face of the SAW modulator substrate.
Figure 2B:
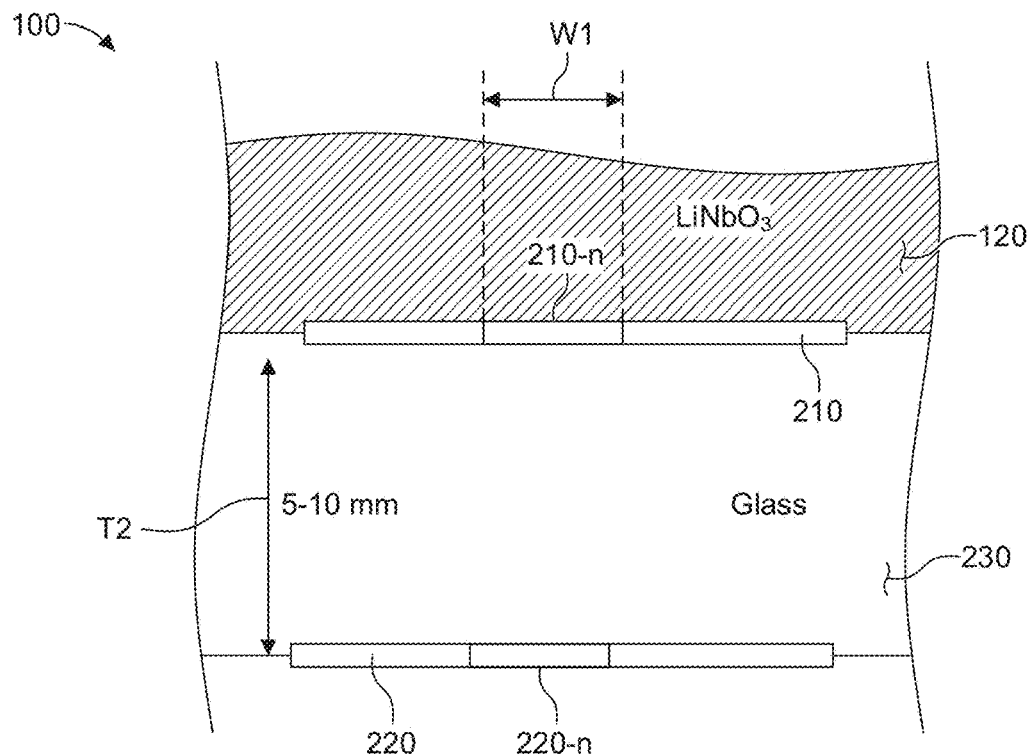
FIG. 2B is a partial cross-sectional side view of the SAW modulator in FIG. 2A, where

FIG. 2B shows more detail for the SAW modulator 100 in FIG. 2A. In one example, the SAW modulator 100 has a lithium niobate substrate 120 and a glass spacer layer 230. Each micro-optic elements 210-n, 220-n of the first output optics 210 and the second output optics 220 are typically between 0.5 and 1 mm long in the direction of the waveguide 102. The first micro-optics array 212 and the second micro-optics array 222 typically also have an alignment tolerance of less than 100 micrometers (μm) with respect to each other in the direction of the waveguide 102.

Figure 2C:
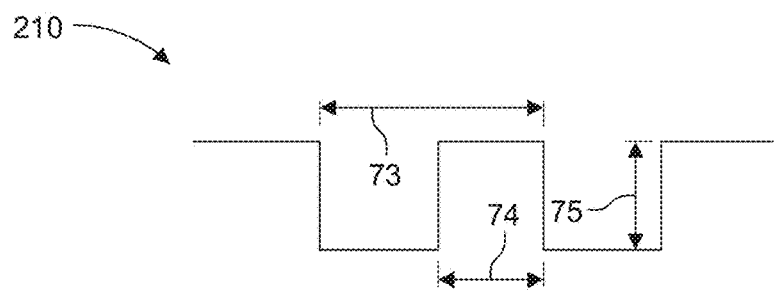
FIG. 2C and FIG. 2D provide more detail for the optical layers in FIG. 2B.
Figure 2D:
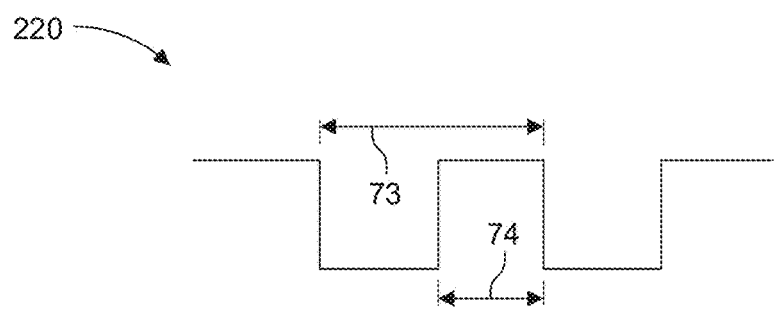

FIGS. 2C and 2D show more detail for the first micro-optics output array 210 and the second micro-optics output array 220. In FIG. 2C, the first output optics array 210, in one implementation, designed for red light, has a grating periodicity 73 in a range from 250-300 nanometers (nm), a feature size 74 in a range from 125-150 nm, and an estimated ruling/grating depth (e.g. height) 75 in a range from 200-400 nm. In FIG. 2D, the second micro-optics output array 220, in one implementation, has a grating periodicity 73 that is a typically 1000 nm or greater and a feature size of 500 nm or greater.

Figure 2E:
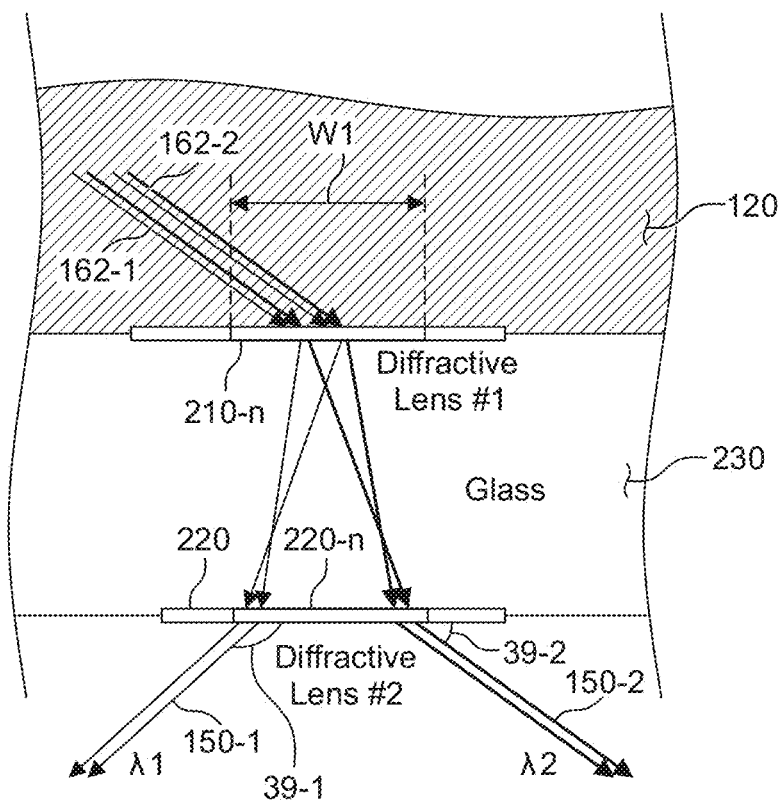
FIGS. 2E and 2F are partial cross-sectional side views of SAW modulators as in FIGS. 2A-2D, where FIG. 2E provides more detail for how light of different wavelengths is emitted at different exit angles, and where
Figure 2F:
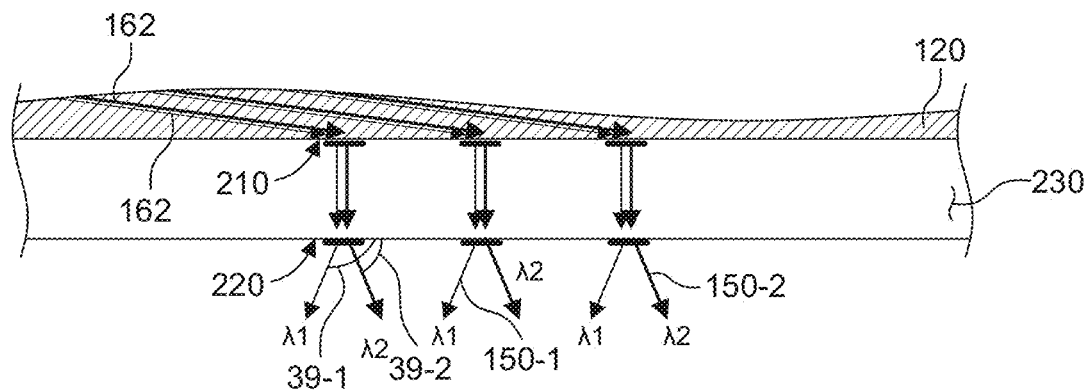

FIGS. 2E and 2F show cross-sectional side views showing a different way of using the first micro-optics output array 210 and the second micro-optics output array 220, in which the first micro-optics output array 210 is diffractive, the second micro-optics output array 220 is either diffractive or refractive, and the output angle is determined by a variable laser wavelength instead of or in addition to the RF frequency.

In FIG. 2E, light of different wavelengths of light $\lambda 1$, $\lambda 2$, having been diffracted by SAW at substantially the same angles, are emitted as output light 150-1 and 150-2 at different exit angles 39-1 and 39-2, primarily because the grating 210 has an especially high spatial frequency and hence high dispersive power.

FIG. 2F is an expanded side view of the SAW modulator in FIG. 2E and shows light signals entering at substantially the same input angle but at different locations along the first micro-optics output array 210 and the second micro-optics output array 220.

Figure 3A:
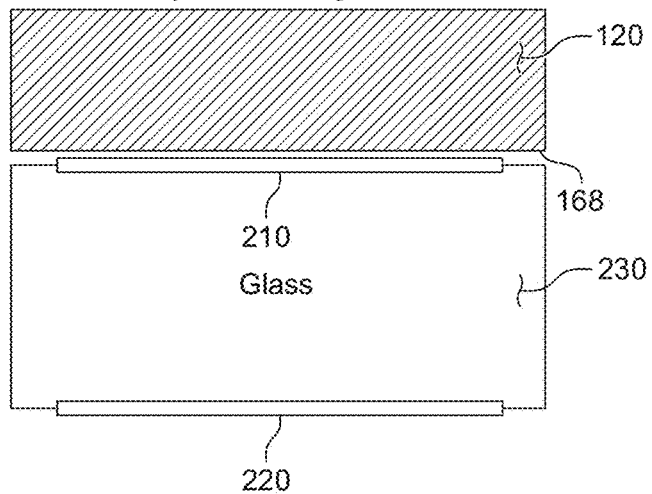
FIGS. 3A-3D show different exemplary configurations of SAW modulators providing a pixelated magnification capability, in accordance with principles of the invention.
Figure 3B:
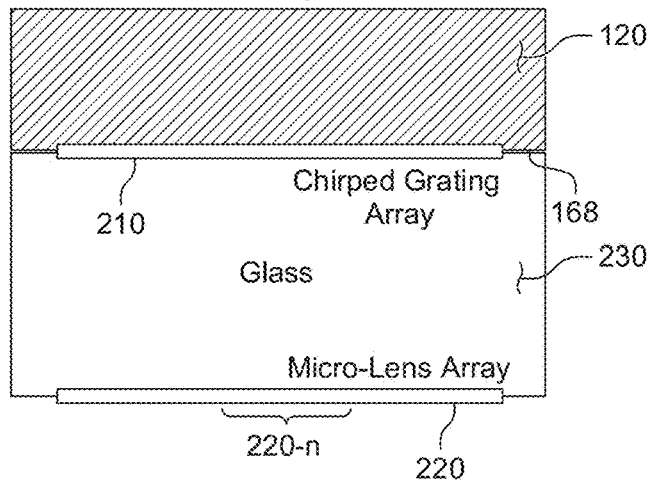
Figure 3C:
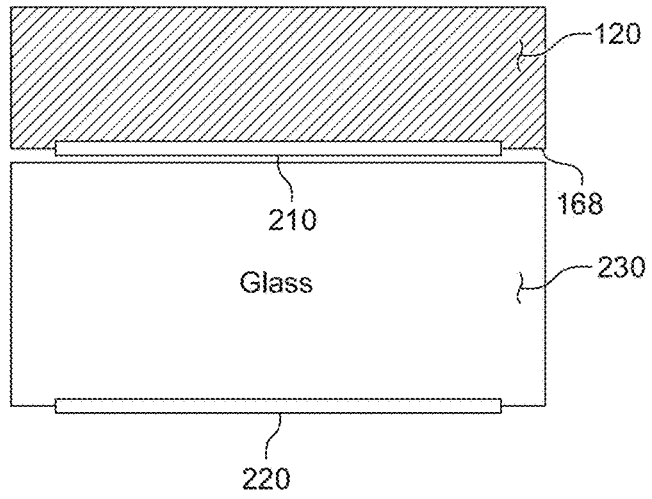

FIGS. 3A-3C show different exemplary configurations for providing a pixelated demagnification capability, in accordance with principles of the invention.

FIG. 3A shows both the first micro-optics output array 210 and the second micro-optics output array 220 formed on the glass spacer layer 230, and the piezoelectric substrate 120, e.g., lithium niobate, is applied/bonded to the top output optics layer 212/first micro-optics output array 210.

FIG. 3B shows a traditional micro-lens array configuration formed at a glass/air interface, where the first micro-optics output array 210 is a diffractive micro-lens array such as a chirped grating, and the second micro-optics output array 220 is a refractive micro-lens array.

FIG. 3C, in contrast, shows the first micro-optics output array 210 formed at the distal face 168 of the SAW modulator substrate 120 and the second micro-optics output array 220 formed at a distal face of the spacer layer 230.

Figure 3D:
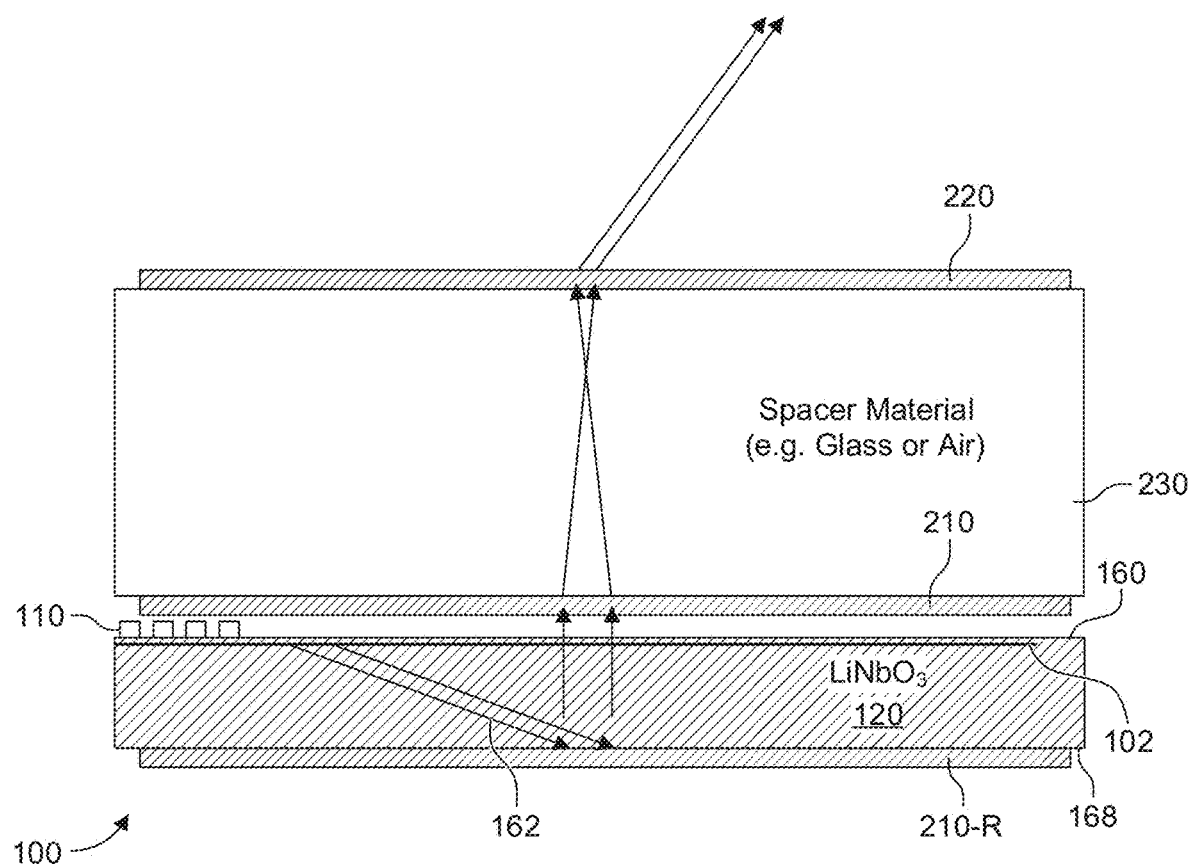

FIG. 3D shows an alternative configuration utilizing a reflective grating 210-R on the distal face of the SAW substrate 120. The reflective grating 210-R redirects the diffracted light 162 in the substrate 120 back toward the proximal face 160 and into the first micro-optics output array 210 and the second micro-optics output array 220 of the glass spacer layer 230. The glass spacer layer 230 is adjacent to the proximal face 160 of the SAW substrate and possibly bonded or otherwise attached to the proximal face 160. In certain configurations, higher diffraction efficiencies can be achieved by utilizing a reflective optic, such as a blazed reflection grating, in place of a transmission grating.

In the example depicted, the waveguide 102 and IDT 110 are on the proximal face 160 of the piezoelectric SAW substrate 120. The reflective grating 210-R is fabricated in or on the distal face 168 of the substrate 120 or in one or more layers deposited on the substrate 120. The first micro-optics output array 210 and the second micro-optics output array 220 are positioned above the SAW substrate 120.

In operation, light is directed out of the waveguide 102 by the SAW generated at the IDT 110. From there, light strikes the reflective grating 210-R, which redirects it at or near normal to the faces of the SAW substrate 120 and through the proximal face 160 of the SAW substrate 120. Light then passes through the first micro-optics output array 210 and the second micro-optics output array 220, which can be formed in the spacer layer 230 or in layers deposited on the spacer layer 230 and/or SAW substrate 120. Both refractive and diffractive lens arrays can be utilized for first micro-optics output array 210 and the second micro-optics output array 220.

Figure 4:
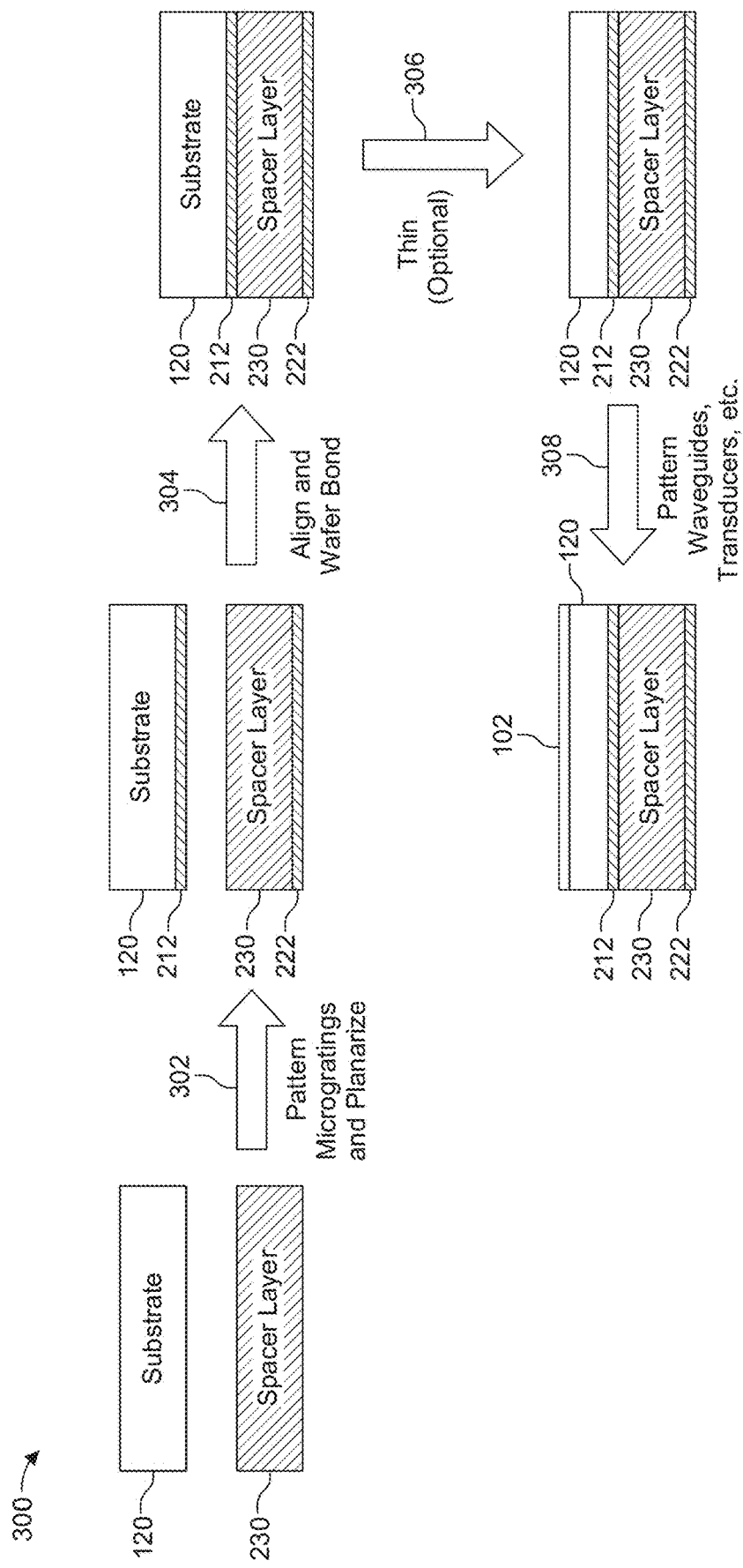
FIG. 4 shows an exemplary method for fabrication.

FIG. 4 shows an example fabrication method for the proposed SAW modulator 100 of FIG. 2A, for example.

In step 302, piezoelectric material 120 and spacer material 230 are both patterned to form the first micro-optics output array 210 and the second micro-optics output array 220. The first micro-optics output array 210 might be patterned on the bottom of the piezoelectric substrate 120 in a first output optics layer 212 deposited on the substrate 120. The second micro-optics output array 220 is patterned on the bottom of the spacer layer 230, or in a second output optics layer 212 deposited on the spacer layer 230.

According to step 304, the piezoelectric substrate 120 and spacer layer 230 are aligned and bonded together such that the first micro-optics output array 210 is directly on top of and aligned to the second micro-optics output array 220.

Optionally, in step 306, the piezoelectric substrate 120 can be thinned in a chemical mechanical planarization (CMP) step.

Finally, in step 308, one or more waveguides 102 and one or more IDTs 110 are patterned on or into the piezoelectric substrate 120 and interconnects that enable the introduction of input light 101 from the optical source 40 and RF signals 15 from the RF drive circuit 25 to the IDT 110 are added.

Additionally or alternatively, the first micro-optics output array 210 and the second micro-optics output array 220 can be patterned on the top and bottom of the spacer layer 230.

If we compare this approach to a single-layer-of-output-optics approach emphasized in U.S. patent application Ser. No. 15/883,802, the pixelated demagnification approach has the disadvantage of needing a second aligned layer, which adds to complexity. However, it has a significant advantage in being tolerant to relatively long laser pulses, to laser synchronization drift, and to SAW frequency dispersion. More specifically, with a single lens layer, the angle of exit light depends on both the angle and position of the light diffracted out from the waveguide. By contrast, in the demagnification approach, the angle of exit light depends (approximately) only on the angle, not the position, of the light diffracted out from the waveguide. Therefore, if the pulse's position is wrong, either because it moved within the duration of the laser pulse, or because the laser pulse started at the wrong time (for any of a number of reasons, including SAW velocity drift), then it causes an emission angle error in the single-layer approach but not in the demagnification approach.

FIGS. 5A-5D show alternative embodiments of proposed optical configuration providing a pixelated demagnification capability. The SAW modulators 100 in FIGS. 5A through 5D are fabricated and configured to emit the "demagnified" exit light signals 150.

Figure 5A:
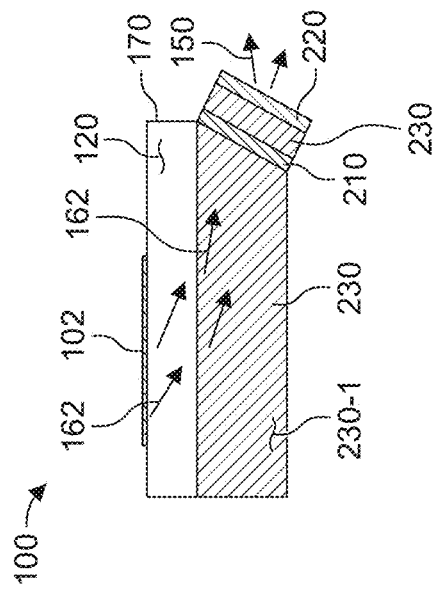
FIGS. 5A-5D each show alternative configurations for SAW modulators having a pixelated demagnification capability that provide emission of the light signals from an end face of the SAW modulator substrate.

FIG. 5A shows the simplest configuration of an edge emitting (edge fire) SAW modulator 100. The first micro-optics output array 210 and the second micro-optics output array 220 are formed to opposite sides of the spacer layer 230 to form an assembly, and the assembly in turn is bonded to an end face 170 of the piezoelectric substrate 120 that incorporates the waveguide 102 and MT 110. In the specific illustrated example, the end face 170 of the SAW substrate 120 has been polished to an obtuse angle, measured from grazing. This angle might be between 110 and 140 degrees.

Figure 5B:
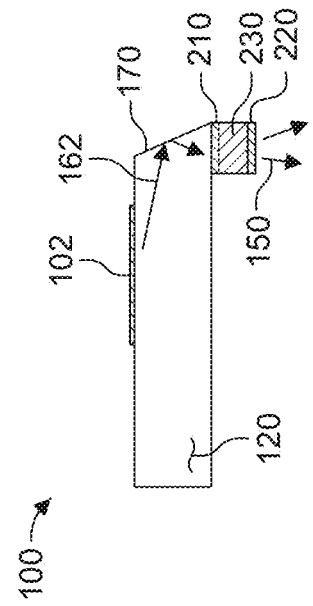

In FIG. 5B, the same assembly of first micro-optics output array 210, the second micro-optics output array 220 and spacer layer 230 is bonded to an end face of a second glass spacer substrate 230 (or another material having an index of refraction that is preferably higher than glass). The piezoelectric substrate 120 is then aligned and bonded to the top of the second glass spacer substrate 230-1. In operation, the light propagates from the piezoelectric material 120 to second glass spacer substrate 230-1 to the assembly including first micro-optics output array 210/second micro-optics output array 220/spacer layer 230 that forms the notional telescope. This allows a thinner piezoelectric substrate 120 for a given waveguide length.

Figure 5C:
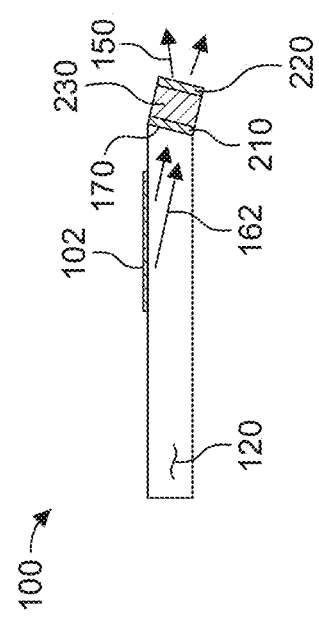

According to FIG. 5C, the first micro-optics output array 210 is fabricated to be between the piezoelectric substrate 120 and a spacer layer 230 which may be glass, air, or another transparent medium. The second micro-optics output array 220 is then patterned within or bonded to the spacer layer 230, or otherwise aligned with the top optics array. This allows the use of a material for carrying the light signals that has a lower index of refraction than the bottom glass layer in FIG. 5B, where the light signals do not experience total internal reflection.

In the specific illustrated example, the end face of the spacer layer 230 has been polished to an obtuse angle, measured from grazing. This angle might be between 110 and 140 degrees.

Moreover, this embodiment/configuration also increases the length of the notional telescope formed by the first micro-optics output array 210/second micro-optics output array 220/spacer layer 230, which can help with alignment tolerance and other considerations. It is also important to note that the first micro-optics output array 210/second micro-optics output array 220/spacer layer 230 would not all be the same in this configuration, where the focal lengths of each would be modified to be appropriate to the corresponding lens-to-lens distance t2.

Figure 5D:
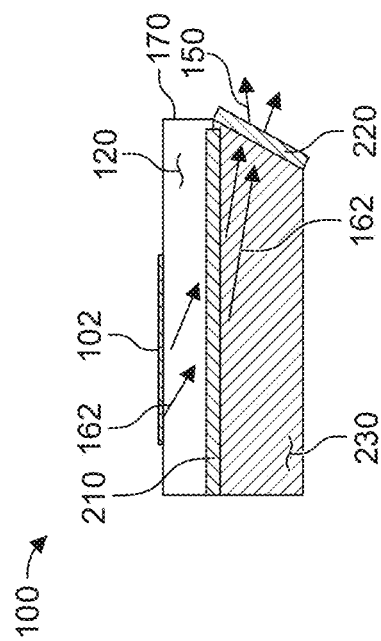

FIG. 5D is a variation on the SAW modulator 100 of FIG. 5A, where the assembly formed by the first micro-optics output array 210/second micro-optics output array 220/ spacer layer 230 is instead bonded directly to the bottom of the piezoelectric substrate 120. This enables the diffracted light 162 to be emitted out the bottom of the SAW modulator 120 which can be more convenient for assembly.

Figure 6B:
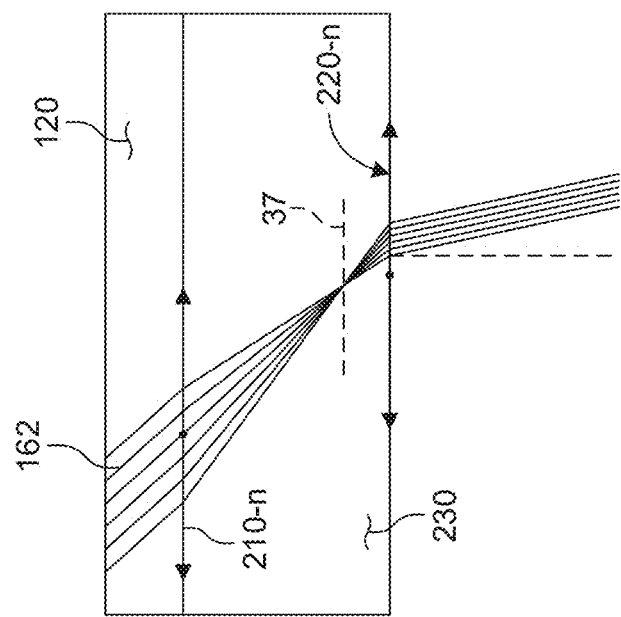
FIG. 6B shows the ray paths in a cross-sectional side view of a proposed SAW modulator providing a pixelated magnification capability that also shows rays of light signals introduced to, traveling within, and exiting the SAW modulator for comparison to the existing SAW modulator in FIG. 6A.
Figure 6A:
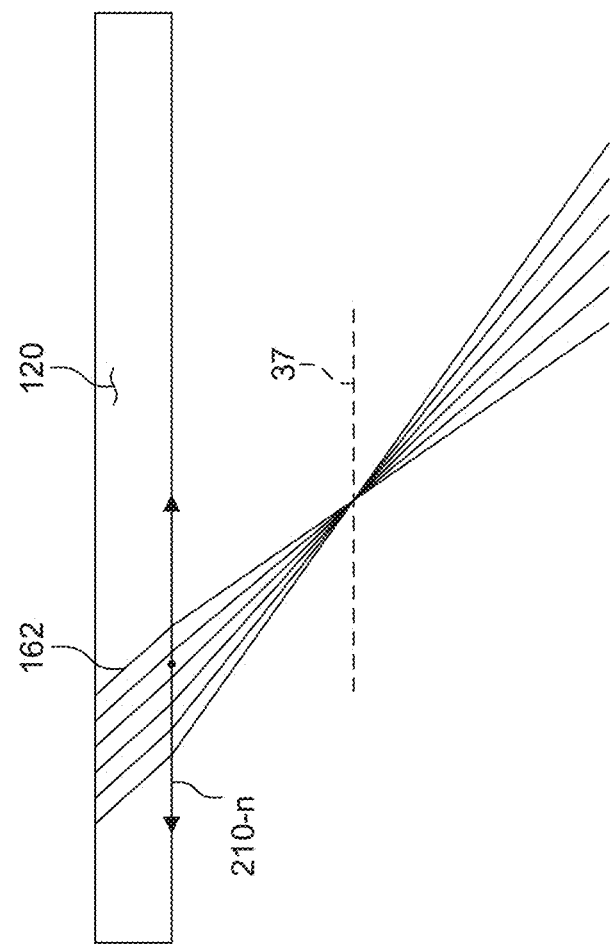
FIG. 6A shows the ray paths in a cross-sectional side view of a SAW modulator having an exit optic that shows rays of light signals introduced to, travelling within, and exiting the SAW modulator.

FIG. 6A and FIG. 6B compare ray traces of light signals exiting from SAW modulators, with the existing single-lens-layer configuration (FIG. 6A) to embodiments of the proposed two-lens-layer configuration providing a pixelated demagnification capability (FIG. 6B).

In FIG. 6A, the optical system has been constructed in accordance with principles of U.S. patent application Ser. No. 15/883,802, where a single layer of lenses micro-optic elements 210-n of the first output optics 210 collimates and focuses the light from the substrate 120 at a focal plane 37. However, after the focal plane 37, the light diverges as shown.

In contrast, in FIG. 6B, each micro-optic element 210-n, 220-n of the first output optics 210 and the second output optics 220 function together to create a collimated beam of exit light 150 that are emitted from the SAW modulator 100 independent of where along the waveguide 102 the light was diffracted.

Figure 1:
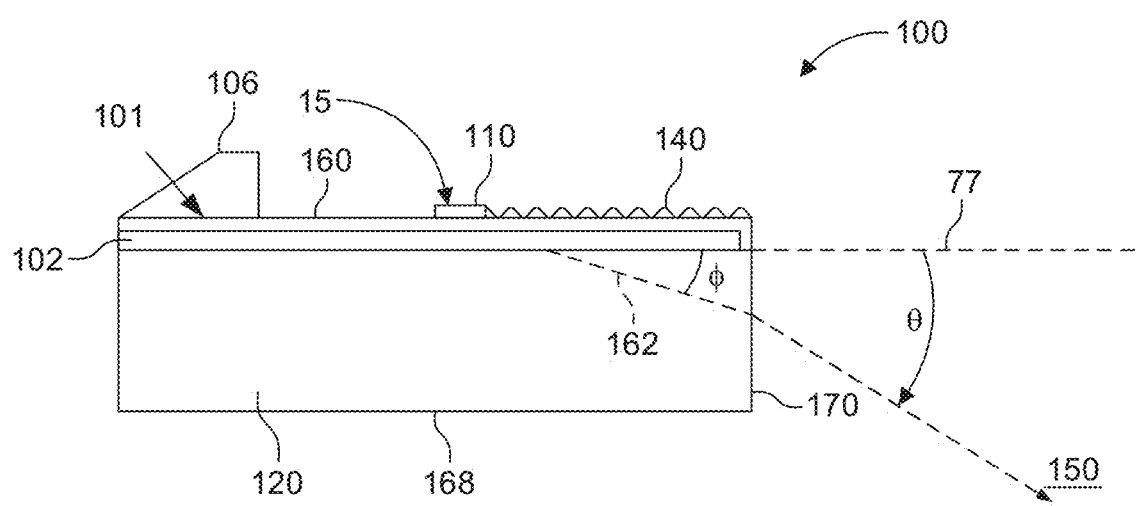
FIG. 1 shows a side view of a prior art SAW modulator.

FIGS. 7A-1 and 7A-2 show plots of numerical simulations of intensity of exit light from existing SAW modulator 100. FIG. 7A-1 shows the intensity of the light signals at an ideal instant and FIG. 7A-2 shows the light intensity for a 20 nanosecond (ns) pulse. The plots are based on numerical simulations of light propagation and diffraction for one layer of diffractive lenses.

Recall that a key requirement of a light-field generator is the ability to controllably send different profiles of light into different directions. For example, consider the process of sending a signal pixel of light to a viewer looking at it from 20°, but not to a viewer at 22°. FIG. 7A-1 shows that, for an ideal infinitely-short pulse, the system is quite capable of doing that the blurring of exit angles is much less than 2°. However, FIG. 7A-2 shows that, for a 20 ns pulse, the system is no longer capable of sending different images to 20° and 22° without cross-talk the blurring of exit angles is much larger than 2°. Thus the ability of the display system to steer light controllably into sharply-defined specific directions is greatly compromised by the longer pulse. In the case of a 3D display, this has negative implications for visual quality and depth.

Figures 2, 7B:
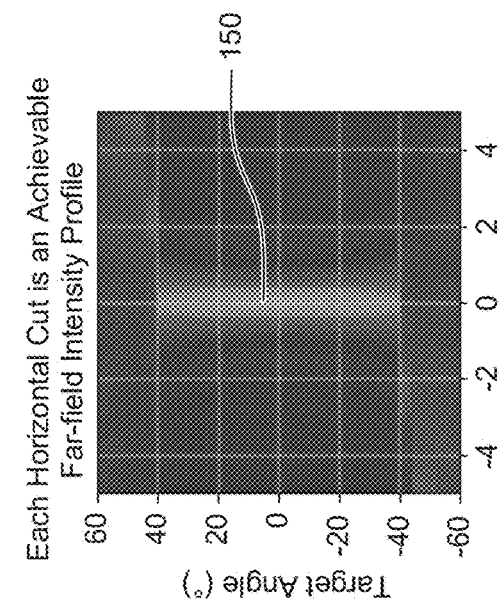
Figures 1, 7A:
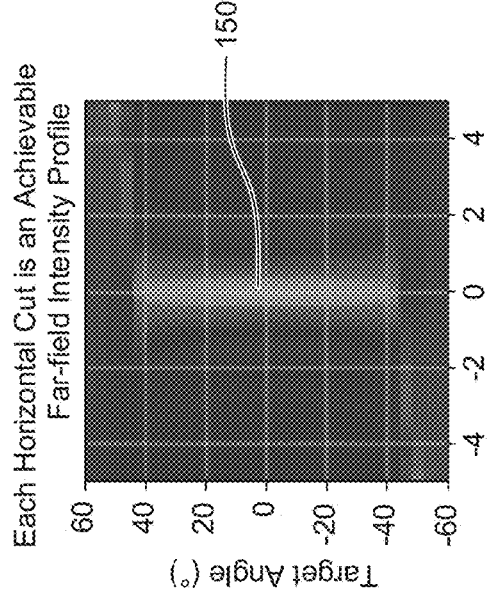
Figures 1, 7B:
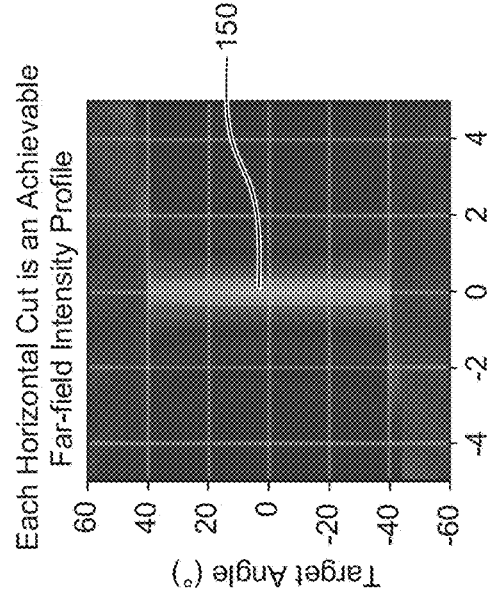

FIGS. 7B-1 and 7B-2 similarly show plots of numerical simulations of intensity of exit light as a function of exit angle for proposed SAW modulators 100 providing a two-optic telescope-based pixelated demagnification capability. FIG. 7B-1 shows the intensity of the light signals at an ideal instant and FIG. 7B-2 shows the light intensity for a 20 ns pulse. Note that the ability to sharply control exit angles is not appreciably compromised by this duration pulse.

When the light source 40 providing the light signals is turned on at the ideal instant—i.e., the instant assumed in the design of the output optics array and SAW waveform—the approaches in FIGS. 7A-1 and 7B-1 work equally well. However, if the light source 40 providing the light signals is still on 10 ns later, the SAW waveform has moved, thus sending the light signals to a different angle in one case, but the same angle in the other case. If there are 100 views, and 1 mm pixels (spatial resolution), then a single-lens approach requires the SAW position to be accurate to roughly 1 mm/100=10 µm, whereas the pixelated demagnification approach tolerates SAW signal position errors up to roughly the pixel size (1 mm in this example). The laser pulse can be correspondingly longer in the demagnification architecture, which has the advantages of both simplifying the laser pulsing method and lowering the laser peak power.

Figures 1, 8A:
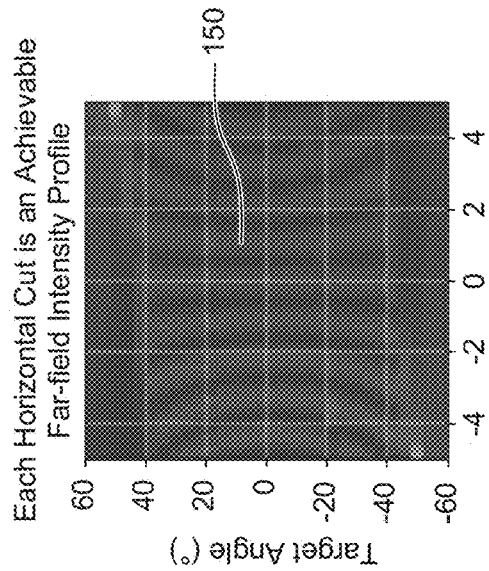

FIGS. 8A-1 and 8A-2 show plots of numerical simulations of intensity of exit light as a function of exit angle for existing SAW modulators as in FIGS. 7A-1/7A-2. However, FIG. 8A-1 shows the intensity of the light signals when no uncompensated acoustic dispersion is present and FIG. 8A-2 shows the light intensity in the presence of a 0.3 (m/s)/MHz SAW frequency dispersion.

These figures show the effect of uncompensated SAW frequency dispersion (i.e. SAW frequency dispersion which was not already accounted for in the choice of SAW waveform). Dispersion tolerance is especially important in the "traveling pulse" architecture, where it is impossible to do certain types of computational correction for SAW frequency dispersion. (For further description of this architecture, see U.S. Publication No. 219/0025666 A1 published Jan. 24, 2019, entitled Systems and Methods for Light Field Generation, by Steven J. Byrnes, Gregg E. Favalora, Ian Ward Frank, Anthony Kopa, Michael G. Moebius, and Joseph J. Register, filed on Jul. 20, 2018, which is incorporated herein by this reference.) But dispersion tolerance is also important in "traditional strobe" and other architectures, because SAW frequency dispersion is never perfectly correctable, as it may change with aging, temperature, etc.

Figures 1, 8B:
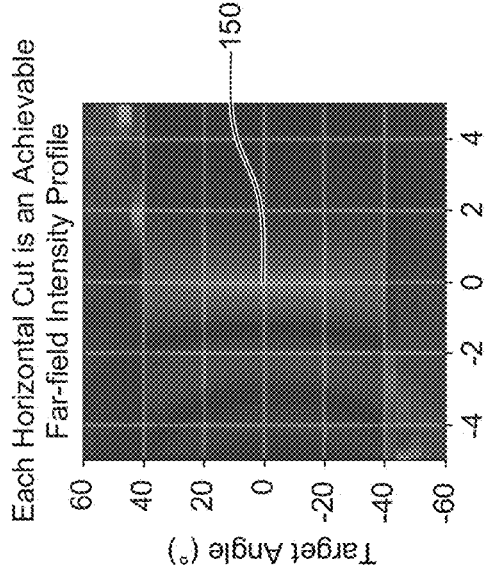
Figures 2, 8A:
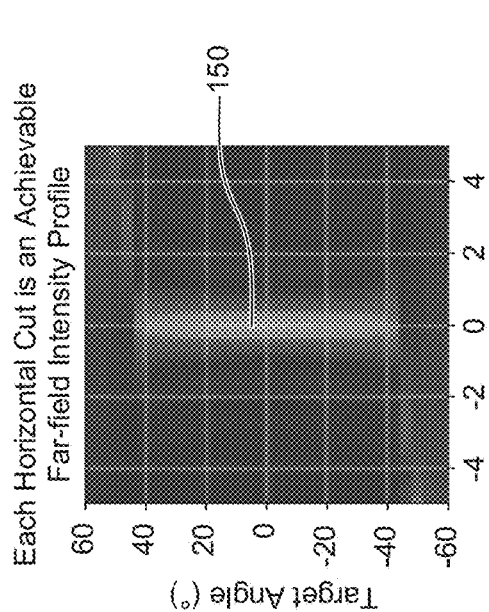
Figures 2, 8B:
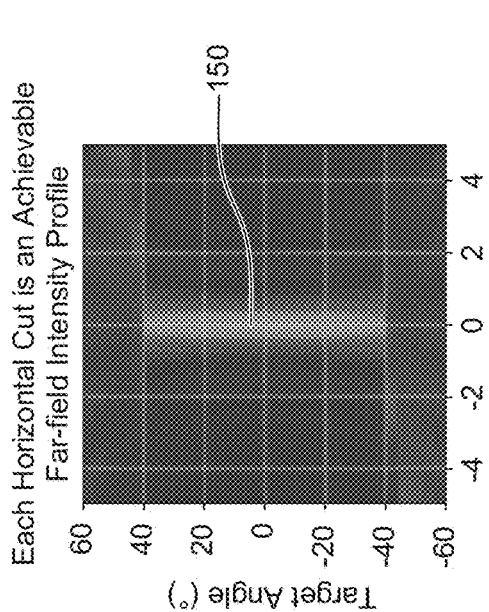

FIGS. 8B-1 and 8B-2 show plots of numerical simulations of intensity of light signals as a function of exit angle for proposed SAW modulators providing a pixelated demagnification capability. FIG. 8B-1 shows the light intensity when no uncompensated SAW frequency dispersion is present and FIG. 8B-2 shows the light intensity in the presence of a 0.03 (m/s)/MHz SAW frequency dispersion.

Illumination of a single view requires a broadband, chirped SAW waveform in the single-lens approach of FIGS. 7A-1/7A-2 and FIGS. 8A-1/8A-2, but requires a narrowband SAW waveform in the demagnification approach of FIGS. 7B-1/7B-2 and FIGS. 8B-1/8B-2. Therefore, demagnification is much more tolerant of SAW frequency dispersion (frequency-dependent speed of sound).

Figure 9:
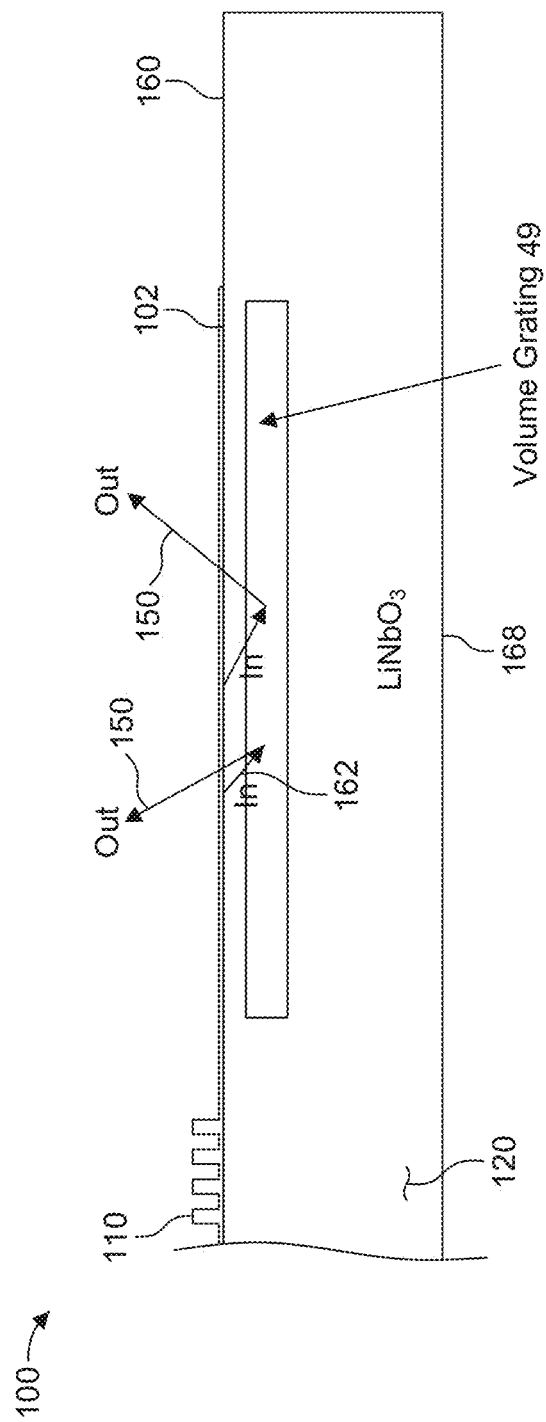
FIG. 9 is a schematic cross section of an embodiment of a volume grating for improving the exit angle of the light signals emitted from the SAW modulator.

FIG. 9 shows a cross-section of a SAW modulator 100 utilizing superimposed volume grating outcouplers. A volume grating 49 is embedded in the substrate 120 beneath the waveguide 102 of the SAW modulator 100 or is a spacer substrate bonded to the substrate 120, and has the effect of both redirecting light diffracted light 162, for example, so that it exits out the top or bottom face, and increasing the range of exit angles of the exit light 150. The volume grating 49 is typically computed from multiple superimposed (i.e. summed) volumetric index profiles that are each designed to facilitate Bragg diffraction between a matched pair of (incident angle, exit angle) of the light signals.

Use of superimposed volume gratings 49 is another angle-spreading-and-redirecting approach with some of the same features and advantages as the pixelated demagnification embodiments described herein above; in particular, the gratings 49 are compatible with long pulses and tolerant of pulse timing jitter and SAW frequency dispersion.

To design a superimposed volume grating 49, in one example, a desired correspondence between incoming light angles and outgoing light angles, for example {(12° in, −30° out), (12.1° in, −28° out), (12.2° in, −26° out), . . . } is calculated. For each (in, out) pair, the ideal volume grating is calculated which, at the operating wavelength, would diffract one to the other by Bragg diffraction. The resulting volume gratings are summed/superimposed to obtain a total ideal volumetric index profile such as the volume grating 49.

In examples, the phase pattern of the volume grating 49 is created by either laser writing, or multiple-exposure holography (where each (in, out) pair is taken in sequence, reversing the direction of the "out" beam so that it is a source rather than a destination, and exposing the photo-sensitive medium to the two sources simultaneously), or single-exposure holography with a custom phase plate, or perhaps other possibilities.

The volume grating 49 is formed from multiple volumetric index profiles superimposed upon one another. Each of the volumetric index profiles create a desired correspondence between incoming angles of light signals exiting from the SAW modulator waveguide 102 and outgoing angles (which after refraction become the exit angles) of the exit light signals 150. In one example, each of the volumetric index profiles are based upon a matched pair of (input angle, exit angle) values of the light signals.

Each component volume grating 49 could be specific to the same wavelength, or there could be superimposed gratings for multiple wavelengths. In another example, the correspondence could be {(12° in, −30° out) @500 nm, (12° in, −28° out) @ 501 nm, (12° in, −26° out) @502 nm, . . . }. The outgoing beams could also have one or more different deflections in the opposite (vertical parallax) direction, i.e. into or out of the plane of FIG. 9. There are requirements on how well spaced the different incoming and outgoing angles and wavelengths should be, related to the volume grating depth, the desired spatial resolution, and other parameters. The inputs, outputs, or both could be designed for curved wavefronts instead of plane waves, for example in order to manipulate the output focal plane. The grating could also accommodate light originating in both possible directions of travel down the waveguide of the SAW modulator, for example mapping each originating direction into half of the range of output angles, and using the two directions in a time-multiplexed way.

It should be noted that both pixelated demagnification and superimposed volume gratings not only increase the exit angle of the exit light 150, which correspondingly increases the spread or "fan" of the modulated light signals seen by an observer, but can also redirect it and outcouple the modulated light signals.

Figure 10:
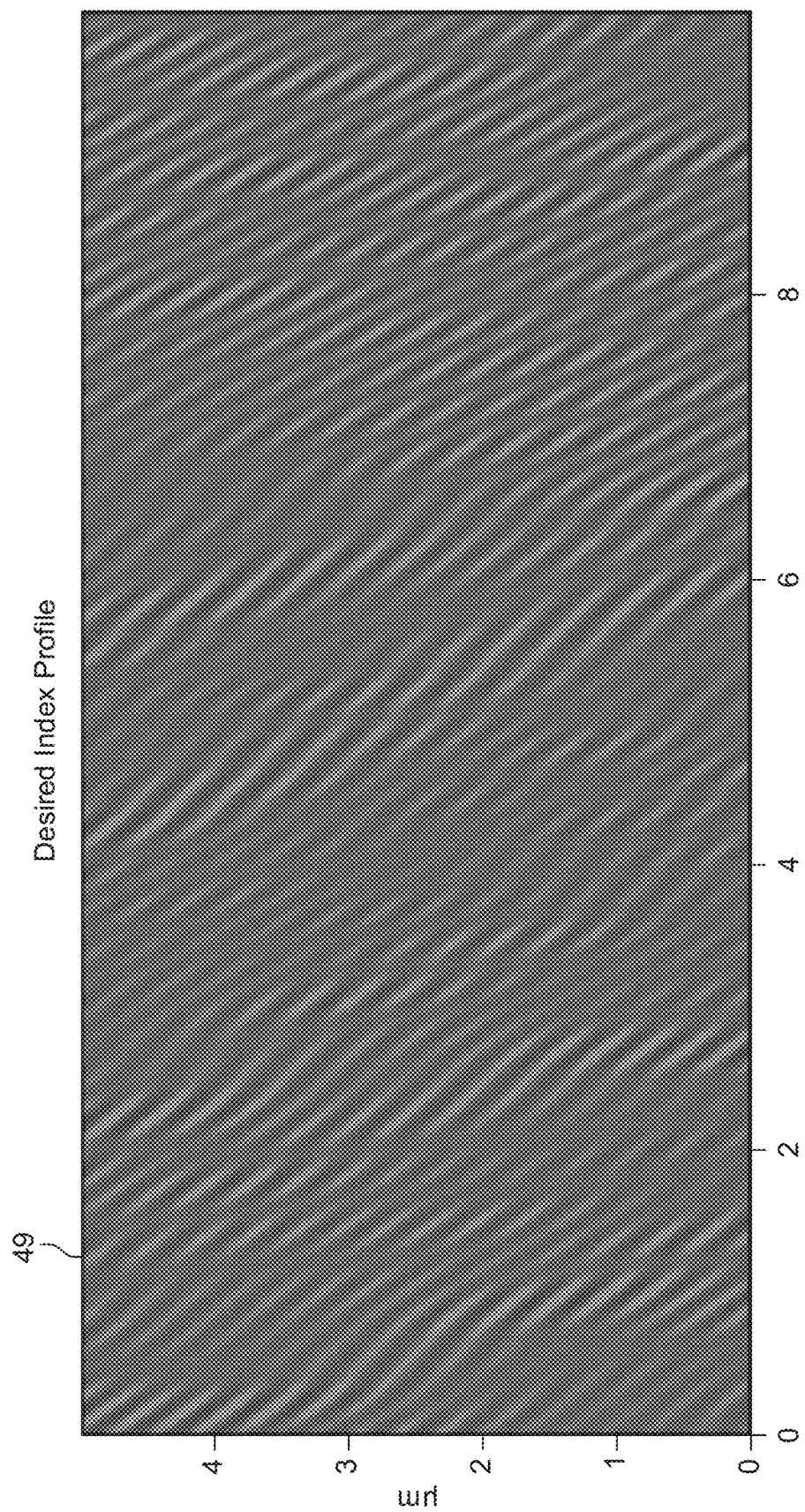
FIG. 10 shows a small section of the volume grating of FIG. 9.

FIG. 10 shows an example section of the index profile for the volume grating 49 that is embedded in the substrate 120 of the SAW modulator 100 or in a spacer substrate.

Figure 11B:
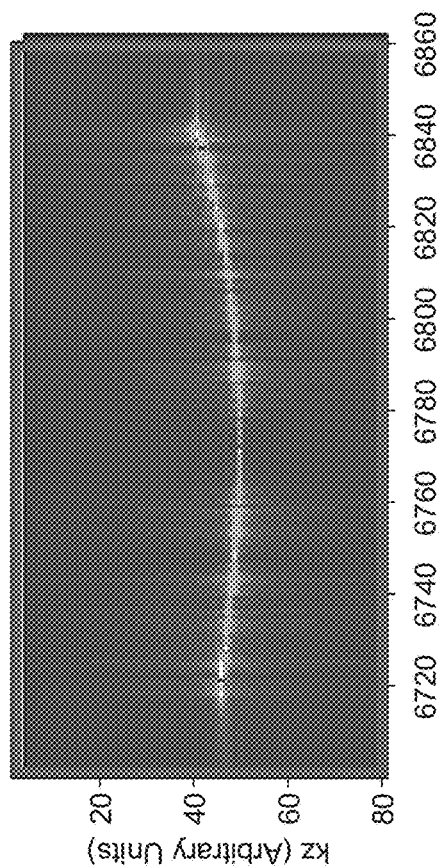
FIG. 11B shows more detail for a selected portion of the Fourier Transform of FIG. 11A.
Figure 11A:
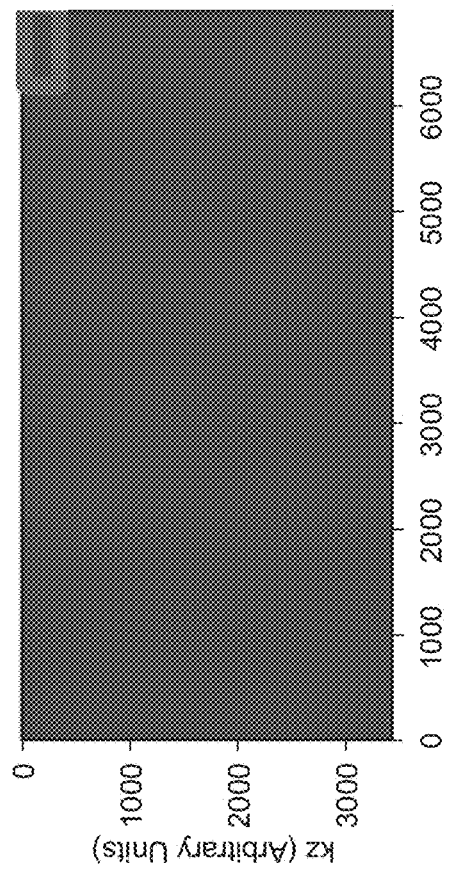
FIG. 11A shows a Fourier Transform of the volume grating in FIG. 9.

FIG. 11A shows the absolute value of the 2D Fourier Transform of the volume grating 49 of which a section is shown in FIG. 9. FIG. 11B shows more detail for a selected portion of the Fourier Transform of FIG. 11A. Each of the distinct dots visible in FIG. 11B correspond to a volume grating intended to facilitate Bragg diffraction for a different (in,out) pair.

Figure 12:
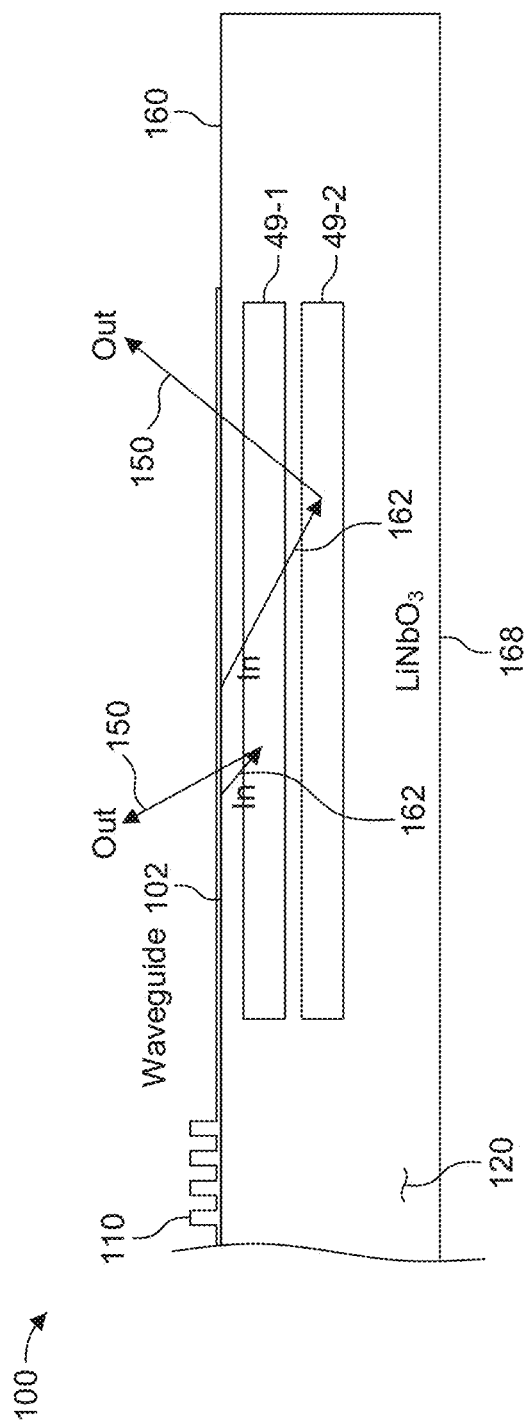
FIG. 12 is a schematic cross section of a SAW modulator having two volume gratings.

FIG. 12 is a cross sectional view of a SAW modulator 100 and outcoupling optics, where two stacked volume gratings 49-1, 49-1 are embedded in the substrate 120 beneath the waveguide 102 of the SAW modulator 100 and arranged in a stacked fashion. Similarly, any number of separate volume gratings, each of which is either simple or superimposed, can be embedded in near the SAW modulator.

Figure 13:
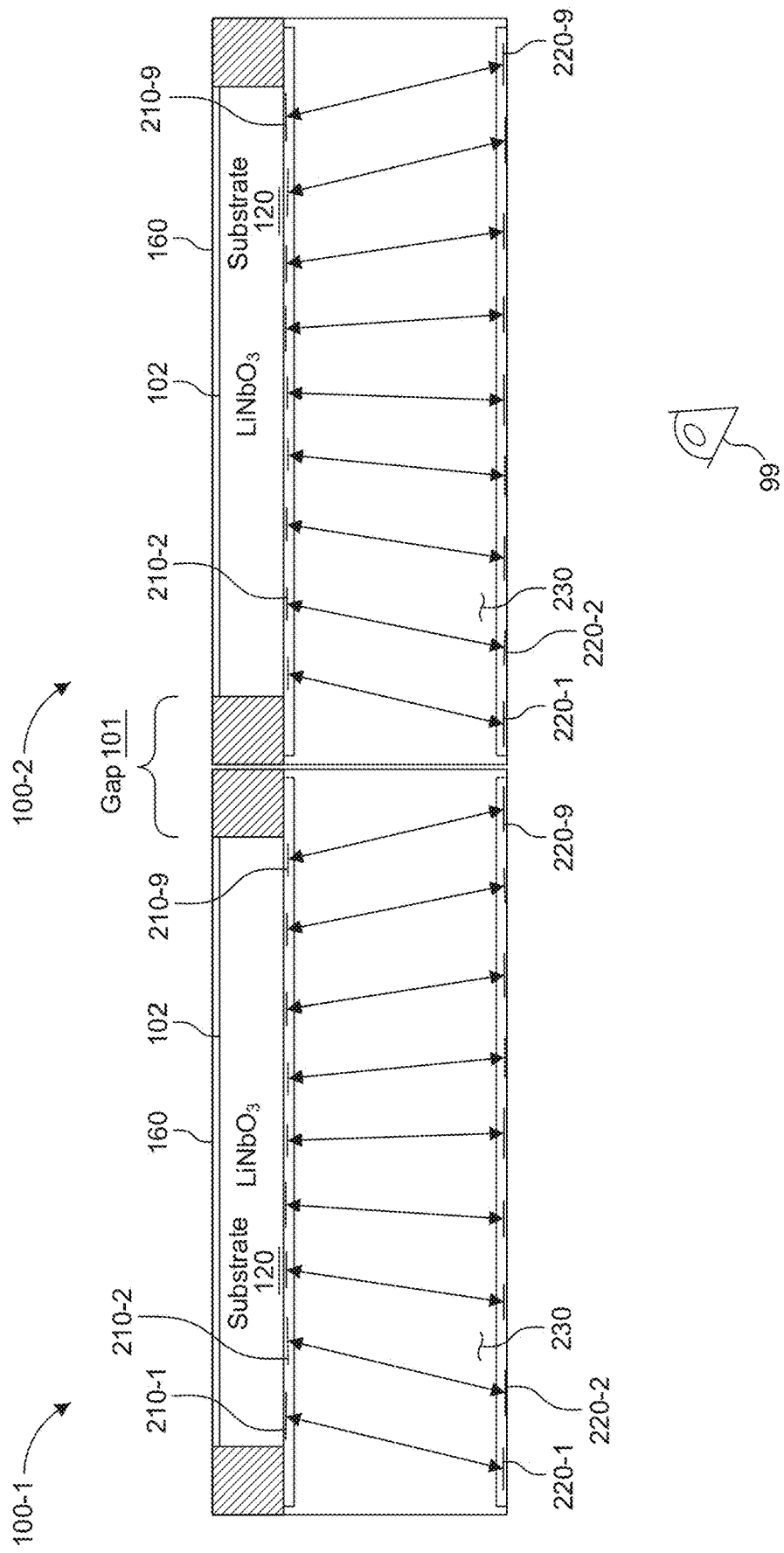
FIG. 13 is a partial cross sectional view showing two adjoining SAW modulators illustrating how micro-telescopes can be used to mask borders between the modulators.

FIG. 13 is a cross sectional view showing how two SAW modulators 100-1 and 100-2 might be coupled to form part of a display or light field projection system.

The first micro-optics output array 210 is matched and aligned to the corresponding second micro-optics output array 220 of the spacer layer 230. The micro-optics arrays 210, 220 need not be the same size, nor necessarily aligned directly on top of each other. For example, if the first micro-optics output array 210 are slightly bigger than the second micro-optics output array 220, then the system can hide gaps 101 between adjacent SAW modulators 100-1 and 100-2, for example related to input couplers and interconnects. This reduces the appearance of borders around individual "tiles" of a light field generating system.

While this invention has been particularly shown and described with references to preferred embodiments thereof, it will be understood by those skilled in the art that various changes in form and details may be made therein without departing from the scope of the invention encompassed by the appended claims.

What is claimed is:

1. An acousto-optical modulator, comprising:
   a substrate having a transducer producing surface acoustic waves on a proximal face, wherein the substrate has a waveguide and the surface acoustic waves polarization-rotate the light out of a guided mode and into a leaky mode of the waveguide causing the light to then exit the waveguide into a bulk portion of the substrate; and
   two arrays of optics for serially conditioning light diffracted in the substrate and that has exited the waveguide, wherein the light exits the substrate at either the proximal face or a distal face, which is opposite the proximal face.

2. A modulator as claimed in claim 1, wherein the modulator is a surface acoustic wave (SAW) modulator.

3. A modulator as claimed in claim 1, wherein the first array of optics focuses the light.

4. A modulator as claimed in claim 1, wherein one of the arrays includes reflective optics.

5. A modulator as claimed in claim 1, wherein the two arrays of optics share substantially the same focal plane.

6. A modulator as claimed in claim 1, further comprising a spacer layer, wherein the two arrays of optics are on either side of the spacer layer.

7. A modulator as claimed in claim 6, wherein the spacer layer is attached to the distal face of the substrate.

8. A modulator as claimed in claim 6, wherein the spacer layer is attached to the proximal face of the substrate.

9. A modulator as claimed in claim 1, wherein the arrays of optics comprise micro-optics distributed along a length of a waveguide in the substrate.

10. A modulator as claimed in claim 1, wherein the optics are gratings.

11. A modulator as claimed in claim 1, wherein the optics are refractive microlenses.

12. A modulator as claimed in claim 1, wherein the optics are transmissive gratings and refractive microlenses.

13. An acousto-optical modulator, comprising:
   a substrate having a transducer producing surface acoustic waves on a proximal face, wherein the substrate has a waveguide and the surface acoustic waves polarization-rotate the light out of a guided mode and into a leaky mode of the waveguide causing the light to then exit the waveguide into a bulk portion of the substrate; and a volume grating for conditioning light diffracted in the substrate and that has exited the waveguide, wherein the light exits the substrate at either the proximal face or a distal face, which is opposite the proximal face.

14. A modulator as claimed in claim 13, wherein the volume grating is formed in the substrate.

15. A modulator as claimed in claim 13, wherein the volume grating directs light to exit from the proximal face of the substrate.

16. A modulator as claimed in claim 13, wherein pixilation occurs in angle space.

* * * * *